United States Patent [19]
Fukuda et al.

[11] Patent Number: 5,094,222
[45] Date of Patent: Mar. 10, 1992

[54] CATALYTIC COMPOSITE AND A COOKER HAVING THE SAME

[75] Inventors: Akio Fukuda, Nara; Masao Maki, Nabari; Yasunori Kaneko; Makiko Waki, both of Nara, all of Japan

[73] Assignee: Matsushita Electric Industrial Co., Ltd., Osaka, Japan

[21] Appl. No.: 612,770

[22] Filed: Nov. 14, 1990

[30] Foreign Application Priority Data

| | | | |
|---|---|---|---|
| Nov. 17, 1989 | [JP] | Japan | 1-300412 |
| Dec. 4, 1989 | [JP] | Japan | 1-314743 |
| Mar. 7, 1990 | [JP] | Japan | 2-55295 |

[51] Int. Cl.$^5$ .................. A21B 1/00; B01J 21/04; B01J 21/08; B01J 35/06
[52] U.S. Cl. .................. 126/19 R; 502/241; 502/244; 502/258; 502/259; 502/260; 502/263; 502/303; 502/304; 502/324; 502/332; 502/335; 502/336; 502/527
[58] Field of Search ........... 502/527, 241, 244, 258, 502/259, 260, 263, 303, 304, 324, 332, 335, 336, 346; 126/19 R

[56] References Cited

U.S. PATENT DOCUMENTS

| | | | |
|---|---|---|---|
| 3,560,408 | 2/1971 | Kiehl et al. | 502/527 X |
| 3,691,097 | 9/1972 | Stiles et al. | 502/527 X |
| 3,697,447 | 10/1972 | Bettinardi | 502/527 X |
| 3,738,350 | 6/1973 | Stiles | 126/19 R |
| 3,993,597 | 11/1976 | Stiles | 126/19 R |
| 4,180,482 | 12/1979 | Nishino et al. | 126/19 R |

FOREIGN PATENT DOCUMENTS

| | | |
|---|---|---|
| 13898/83 | 5/1986 | Australia . |
| 45128/85 | 3/1988 | Australia . |
| 0303055 | 2/1989 | European Pat. Off. . |
| 2001124 | 8/1970 | Fed. Rep. of Germany . |
| 61-122416 | 6/1986 | Japan . |
| 2019240 | 10/1979 | United Kingdom . |

Primary Examiner—W. J. Shine
Attorney, Agent, or Firm—Panitch Schwarze Jacobs & Nadel

[57] ABSTRACT

This invention provides a catalytic composite for decomposing fats and oils, and a heating cooker having the catalytic composite mounted therein. The catalytic composite comprises a porous sheet made of ceramic fibers and/or metal fibers, and a catalyst. The catalytic composite is capable of decomposing oil grease or stains deposited on the inner wall of a heating cooker and cooking exhausts emitted in the process of cooking by oxidation, at relatively low temperatures.

4 Claims, 9 Drawing Sheets

CATALYTIC COMPOSITE AND A COOKER HAVING THE SAME

BACKGROUND OF THE INVENTION

1. Field of the Invention:

The present invention relates to a catalytic composite for decomposing organic substances such as fats and oils, which can be attached to the inner wall of a heating cooker; the present invention also relates to a heating cooker having the catalytic composite for decomposing and removing grease or stains formed from fats and oils that is present in the cooker at comparatively low temperatures.

2. Decription of the Prior Art:

In general, the following two methods are available for the decomposition and removal of grease or stains which is formed and attached to the surface of the inner wall of a heating cooker when fish, meat, or the like is cooked in the heating cooker. In this specification, the heating cooker includes an apparatus with a heating means; for example, an oven, an electric range, etc.

The first method employs a cooker, the cooking chamber of which has an enamel coated inner wall. Grease or stains that adheres to the surface of the enamel coating is thermally decomposed by raising the temperature of the chamber so that the surface temperature of the enamel coating is about 450° C. or more.

The second method employs a cooker having a porous film that contains oxidation catalysts the film being attached to the inner wall of the cooking chamber. Such a porous film is formed from a mixture obtained by dispersing an oxide of transition metals such as an oxides of Mn, Cu, Fe, Co, Ni, or the like, or an oxide of alkaline earth metals, in a binder such as a metal salt of inorganic acids (e.g., a metal salt of phosphoric acid or silicic acid), or enamel. Grease attached to the inner wall of the chamber can be decomposed by oxidation at comparatively low temperatures by the catalytic action of the metal oxide.

However, the foregoing conventional techniques have the following disadvantages.

An enamel coating is liable to crack due to a heat shock when the coating is heated to a temperatures of 500° C. or more, resulting in a separation from the surface of the iron substrate (i.e., the wall substrate). Thus, the iron substrate corrodes and the cooker cannot be used. Furthermore, in the above-mentioned process, high temperatures are required, thus, a large capacity heater is needed. Therefore, a safety problem arises.

In the method of using the porous film, it is desired that the porous film has a high degree of porosity for the purpose of having an area large enough to perform an efficient contact between the grease or stains to be decomposed and the catalyst, and having an area large enough to allow oxygen to be diffused throughout the interior of the film. However, if the porosity of the film is increased, then the hardness of the film lowers; the film is apt to be injured, or the adhesiveness between the film and the inner wall of the cooking chamber is decreased. Furthermore, tar and ash formed by the decomposition of various materials permeates the porous film and settles in voids of the film, resulting in a gradual deterioration of the purifying performance of the film.

The present inventors prepared several kinds of porous films containing the above-mentioned catalyst, and tested the porous film by using salad oil to see the decomposition ability. It was found that it was necessary to heat the porous film at a temperature of at least 400° C. for about two hours so as to decompose it completely. It was found that if the heating temperature was lower, the decomposition was incomplete, and decomposition resides progressively increased.

SUMMARY OF THE INVENTION

The catalytic composite for decomposing fats and oils by oxidation of this invention, which overcomes the above-discussed and numerous other disadvantages and deficiencies of the prior art, is obtained by pressure molding of a mixture containing ceramic fibers and an oxidation catalyst, wherein said ceramic fibers are made mainly of at least one selected from the group consisting of silicon oxide, aluminum oxide, and zirconium oxide, and wherein said oxidation catalyst is at least one selected from the group consisting of manganese oxide, iron oxide, cobalt oxide, nickel oxide, copper oxide, lanthanum oxide, and cerium oxide.

The catalytic composite for decomposing fats and oils by oxidation of this invention comprises: a porous sheet made of aluminum fibers, at least one surface of which is supported on an air permeable metal support; a film of silicon oxide or aluminum oxide which is formed on at least one surface of said porous sheet by anodic oxidation; and an oxidation catalyst carried on the surface of said film, said oxidation catalyst being at least one selected from the group consisting of manganese oxide, iron oxide, cobalt oxide, nickel oxide, copper oxide, lanthanum oxide, and cerium oxide.

In the layered catalytic composite for decomposing fats and oils by oxidation, comprises a first catalytic composite, a second catalytic composite disposed on said first catalytic composite, and an air permeable metal support disposed on at least one surface of the layered body which is composed of said first and second catalytic composites, wherein said first catalytic composite is a sheet obtained by pressure molding of a mixture containing ceramic fibers and an oxidation catalyst, said ceramic fibers being made mainly of at least one selected from the group consisting of silicon oxide, aluminum oxide, and zirconium oxide, said oxidation catalyst being at least one selected from the group consisting of manganese oxide, iron oxide, cobalt oxide, nickel oxide, copper oxide, lanthanum oxide, and cerium oxide, and wherein the second catalytic composite comprises a porous sheet made of aluminum fibers and an oxidation catalyst carried on the surface of said porous sheet, said oxidation catalyst being at least one selected from the group consisting of manganese oxide, iron oxide, cobalt oxide, nickel oxide, copper oxide, lanthanum oxide, and cerium oxide.

In a preferred embodiment, the layered catalyst composite further comprises a film of silicon oxide or aluminum oxide which is formed on said porous sheet, wherein said oxidation catalyst is carried on the surface of said film.

The heating cooker of this invention has the above-mentioned layered catalytic composite, and the layered catalytic composite is attached to the inner wall of said cooker for the purpose of decomposing by oxidation, fats and oils or cooking exhausts formed in the process of cooking so that the first catalytic composite of the layered catalytic composite is faced with said inner wall.

The heating cooker of this invention has the above-mentioned catalytic composite, and the catalytic composite is attached to the inner wall of an exhaust path of said cooker for the purpose of decomposing by oxidation, cooking exhaust emitted in the process of cooking.

Thus, the invention described herein makes possible the objective of:
(1) providing a catalytic composite having sufficient catalytic ability for decomposing fats and oils by oxidation even at comparatively low temperatures of lower than 400° C.; and
(2) providing a heating cooker having the above-mentioned catalytic composite in the cooking chamber or on the inner wall of the exhaust path in order to decompose and remove grease or stains formed in the process of cooking.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

A first catalytic composite of the present invention comprises a ceramic fiber and an oxidation catalyst. As the material of the ceramic fiber, silicon oxide (i.e., silica), aluminum oxide (i.e., alumina), zirconium oxide (i.e., zirconia), and the like can be used. Other ceramic materials can also be used. One kind of these ceramic fibers can be used alone or two or more kinds of the ceramic fibers can be used in combination. Furthermore, ceramic fibers made of two or more kinds of ceramic material can be used. For example, a silica - alumina fiber made of a mixture of silicon oxide and aluminum oxide in a weight ratio of 1:1 is preferably used. The ceramic fiber is about 10 μm or less in diameter, and preferably 1-3 μm in diameter and 5-300 mm in length, and preferably about several tens millimeters in length. As the oxidation catalyst, oxides of transition metals such as manganese oxide, iron oxide, cobalt oxide, nickel oxide, and copper oxide, and composite oxides including rare earth elements such as lanthanum and cerium (for example, composite oxides having a perovskite structure), which are conventionally used as oxidation catalysts, can be used. One kind of these oxides can be used alone or two or more kinds of these oxides can be used in combination. For example, a composite oxide consisting of ferric oxide ($Fe_2O_3$), manganese oxide ($Mn_2O_3$), and cupric oxide ($CuO$) is preferably used. The weight ratio of the ceramic fibers and the oxidation catalyst is not particularly restricted, but usually the oxidation catalyst is used in an amount of 10-100 parts by weight for every 100 parts by weight of the ceramic fiber. The catalyst may be used in higher proportions. For example, there is no problem if the catalyst is contained in the catalytic composite in the proportion of about 50 wt %.

The first catalytic composite of the present invention can be prepared, for example, as follows. First, the ceramic fiber and the oxidation catalyst are mixed in a solvent such as water resulting in a dispersion. The dispersion is filtered by the use of a filter means, for example a mesh filter, to remove the solvent. Then, the mixture is molded in a desired form, for example, a sheet form, by compression molding, followed by drying. Thus a catalytic composite for decomposing fats and oils by oxidation is obtained. The thickness of the sheet-form catalytic composite is usually 0.3-3.0 mm.

Figure 1:
FIG. 1 is a partially enlarged photograph showing a first catalytic composite of the present invention.

FIG. 1 shows a partially enlarged photograph of the first catalytic composite. In the catalytic compounds, silica-alumina fibers of comparatively linear shape are entwined with each other to form a porous sheet; catalysts in powder form are dispersed in the spaces among the fibers. Because the catalytic composite has such a structure thereof, air permeability, and absorption of and permeability to materials such as oils of the composite are excellent. For example, when each of several drops (one drop weighs about 25 mg) of salad oil is applied on the first catalytic composite at several places and the composite is allowed to stand in an electric oven at a temperature of 260° C. or above, the oil is brought to a red heat and begins to burn within 60 sec and, burns off within 5 minutes thereafer. When the amount of oil is increased, a longer time is required until the oil is burned off, and there is no oil residue left. In contrast to this, when the conventional porous film containing oxidation catalyst is used, no such effective catalytic reaction can be accomplished because considerable amount of catalyst contained in the film is buried in a binder. The catalytic composite of the present invention is porous enough to provide good air permeability and thus, sufficient amount of oxygen necessary for oxidation can be supplied. Furthermore, the composite absorbs grease or stains formed in the process of cooking of fats and oils such as salad oil and the like because the grease or stains can permeate the composite. Therefore, the catalysts which are present at an inner portion of the catalytic composite can be used sufficiently, thus, the composite can be used effectively for a long period of time. On the contrary, if the degree of porosity of the composite is low, only the catalyst in the vicinity or the surface of the composite is used and deactivated, resulting in a deactivation of the catalytic composite in a short period of time.

Furthermore, on the surface of the catalytic composite, a large number of catalyst particles exist in an exposed form. Thus such an effective catalytic reaction can be performed.

Figure 2:
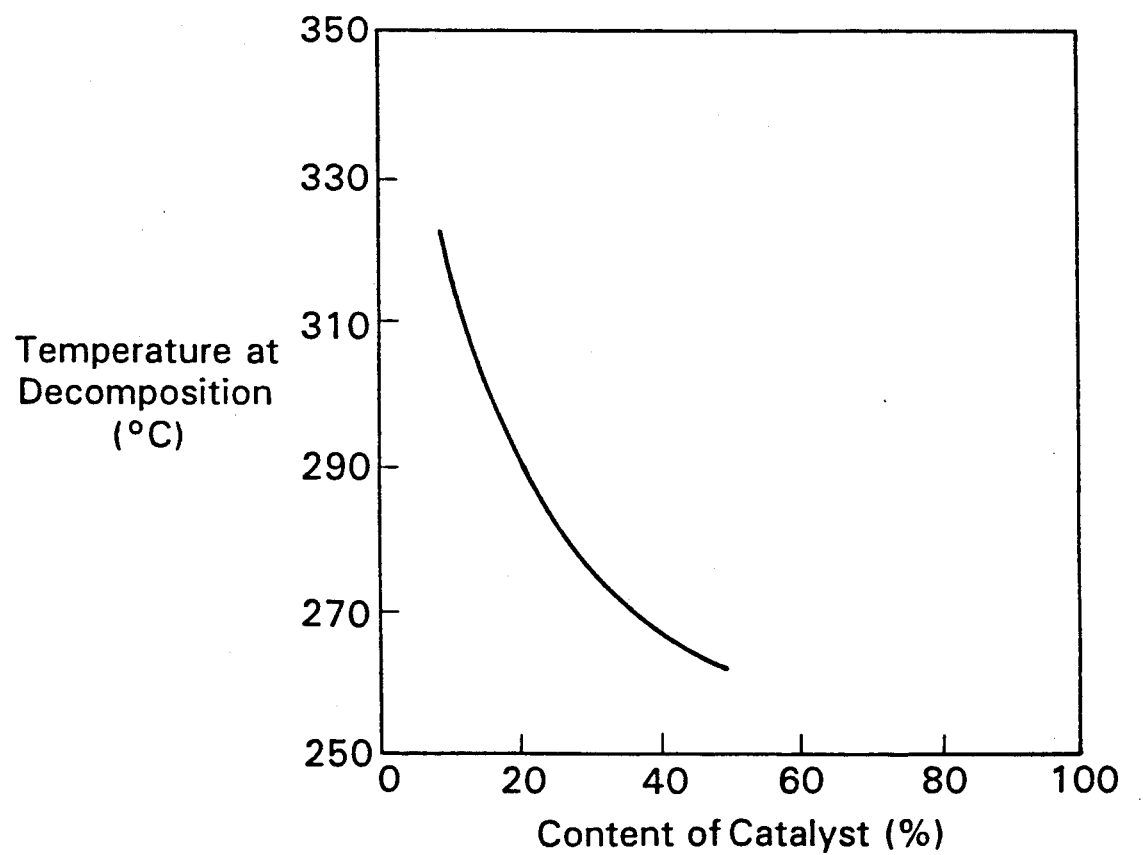
FIG. 2 is a graph showing the relationship between the content of catalyst in a catalytic composite and decomposition temperature of salad oil when the salad oil was decomposed by the use of catalytic composite.

A mixture of the above mentioned silica-alumina fiber (2 μm in diameter and 200 mm in length) and a composite oxide made of ferric oxide, manganese oxide, and cupric oxide was molded into a sheet by compression molding under the pressure of about 50 kg/cm$^2$, and a catalytic composite (a first catalytic compound) of 0.5 mm in width was obtained. Catalytic composites having different catalyst contents were prepared, and decomposition tests were carried out using salad oil. The relationship between a catalyst content and decomposition temperature of salad oil is shown in FIG. 2.

A second catalytic composite of the present invention is a porous sheet made of metal fibers such as aluminum fibers carrying an oxidation catalyst. At least one surface of the sheet is supported on an air permeable support. The material used for the air permeable support should be heat-stable and should have good workability. For example, aluminum expanded metal is preferred for the support. For the fiber component, an aluminum filament having, for example, a diameter of about 80 to 160 μm and a length of 130-150 mm is used. For the oxidation catalyst, the same kinds of catalysts as used in the first catalytic composite can be used, but cupric oxide is most preferred as will be described below.

For preparing the second catalytic composite, first, the above-mentioned metal fibers are press-molded into a sheet. At this time, for protecting the surface of the sheet as well as reinforcing the sheet, it is preferable to layer an air permeable metal support, for example, aluminum expanded metal, on one side of the fiber mass, then compress it into a sheet. Preferably, an anti-oxidation coating is formed on the surface of the resulting aluminum fiber sheet with the support. For example, the sheet is anodized in a silicate bath so that an anti-oxidation coating made of aluminum oxide and silicon oxide is formed on the surface of the support, and on the surface and the vicinity of the surface of the sheet. The anodic oxidation is carried out under alkaline conditions. A coating formed by an anodic oxidation under acidic conditions is hard and has poor flexibility. On the other hand, a coating formed by treatment under alkaline conditions has excellent flexibility, so that the film can comply with any bending of the sheet. It has been found that the resulting sheet with a film of silicon oxide and/or aluminum oxide formed by anodic oxidation has a high degree of corrosion resistance. When the sheet was sprayed with a saline solution for 120 hours (5 days) continuously, no particular charge was observed.

Next, a porous film containing an oxidation catalyst is formed on the surface of the above-mentioned coating using an inorganic silicate as a binder.

For example, a mixture of the above-mentioned binder and the oxidation catalyst is coated on the surface of the sheet, and the sheet is baked, resulting in a porous film containing the catalyst.

Figure 3:
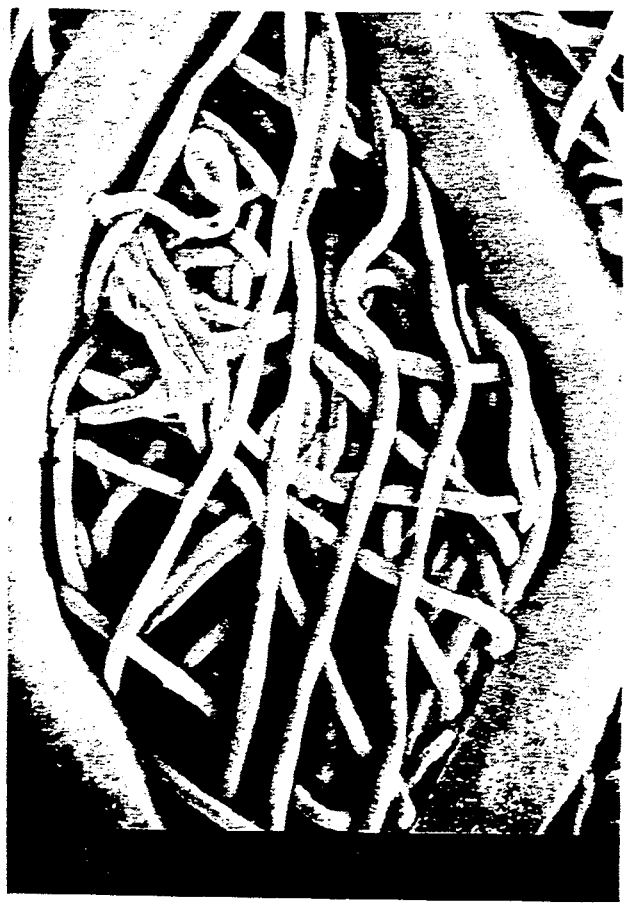
FIGS. 3(a) and 3(b) are partially enlarged photographs showing a second catalytic composite of the present invention.
Figure 3:

The second catalytic composite thus obtained is porous as shown in FIGS. 3(a) and 3(b); the composite has a larger inner surface area than the conventional porous film containing a catalyst, so that the composite has far greater catalytic activity than the conventional porous film. In the decomposition ability tests of the second catalytic composite using salad oil, the ability of the catalytic decomposition of the composite was slightly lower than that of the first catalytic composite, while on the other hand, the second catalytic composite is superior in mechanical strength such as tensile strength, to the first catalytic composite.

It is possible to use not only aluminum fiber but other metal fibers as well, to prepare the second catalytic composite of this invention.

Next, catalysts and binders suitable for the second composite were investigated. Aluminum fibers mean diameter, 150 μm; mean length 100 mm) and an aluminum lath were pressed into a porous sheet having a thickness of 0.8 mm. A porous film was formed on the side of aluminum lath of the sheet according to the method mentioned above, using each of the catalysts and the binders shown in Table 1. The obtained second catalyst composite was layered on the above-mentioned first catalytic composite so that the side without the porous film was facing the first catalytic composite.

Then, salad oil was dropped on the porous film of the layered composite, and the layered composite was allowed to stand in an electric oven at 300° C. to 320° C. and the state of decomposition of the salad oil was visually observed. The results are shown in Table 1. In Table 1, indicates that the salad oil was completely decomposed, and the surface of the catalytic composite was the same as the original; Δ indicates that the surface of the catalytic composite was partially colored; and X indicates that a tar-like material remained on the catalytic composite.

TABLE 1

| Catalyst(s) | Inorganic silicate | Binder Polyborosiloxane | Silicone |
|---|---|---|---|
| CuO | ○ | ○ or Δ[a] | x |
| Fe$_2$O$_3$, Mn$_2$O$_3$ and CuO | Δ | Δ | x |
| Co$_2$O$_3$ | Δ | Δ | x |
| NiO | Δ or x[a] | Δ or x[a] | x |

[a] as the case may be

Generally, as oxidation catalysts for use in decomposing grease or stains produced in the process of cooking, oxides of manganese or oxides of cobalt are known to be preferred. Accordingly, catalysts for decomposing fats and oils which are used for conventional porous films in a commercially available cooker are mainly of the manganese type. However, as is apparent from the table, for the catalyst used in the present composite, copper oxide is most preferred.

This may be explained as follows. Conventional porous films are generally of low porosity because they are basically formed on a flat plate, therefore their permeability to oxygen, and liquid absorption and liquid diffusing ability are limited. Thus, if a higher degree of catalytic function is desired, a catalyst with higher catalytic ability must be used. Therefore, oxides of manganese or cobalt was preferably used rather than copper oxide. In contrast, the second catalytic composite has a highly porous structure made essentially of fibers, and therefore, it has a great advantage over any conventional porous film in both permeability to oxygen and ability to absorb and diffuse liquid. Therefore, even if the activity of the catalyst used in the composite is not particularly high, the composite has high ability of decomposing fats and oils by oxidation.

Generally, during the process of an oxidation reaction, a part of oxidation catalysts is considered to be in the reduced state as follows: a decomposition reaction of fats and oils by oxidation is an exothermic reaction.

Therefore, when manganese oxide or cobalt oxide, which is a highly active catalyst is used, the catalyst is exposed to high temperatures during the process of oxidation, and the catalyst itself is reduced. As a result, the porous film becomes colored. On the contrary, when cupric oxide (CuO) is used as a catalyst, the catalyst is once reduced to cuprous oxide ($Cu_2O$), which can readily be reoxidized under a temperature of about 300° C. or more. Therefore, the coloration due to the color of reduced catalyst (i.e., cuprous oxide) does not occur. As mentioned above, the second catalytic composite having such a catalyst and a binder is well suited for the purpose of decomposing fats and oils by oxidation.

Figure 4:
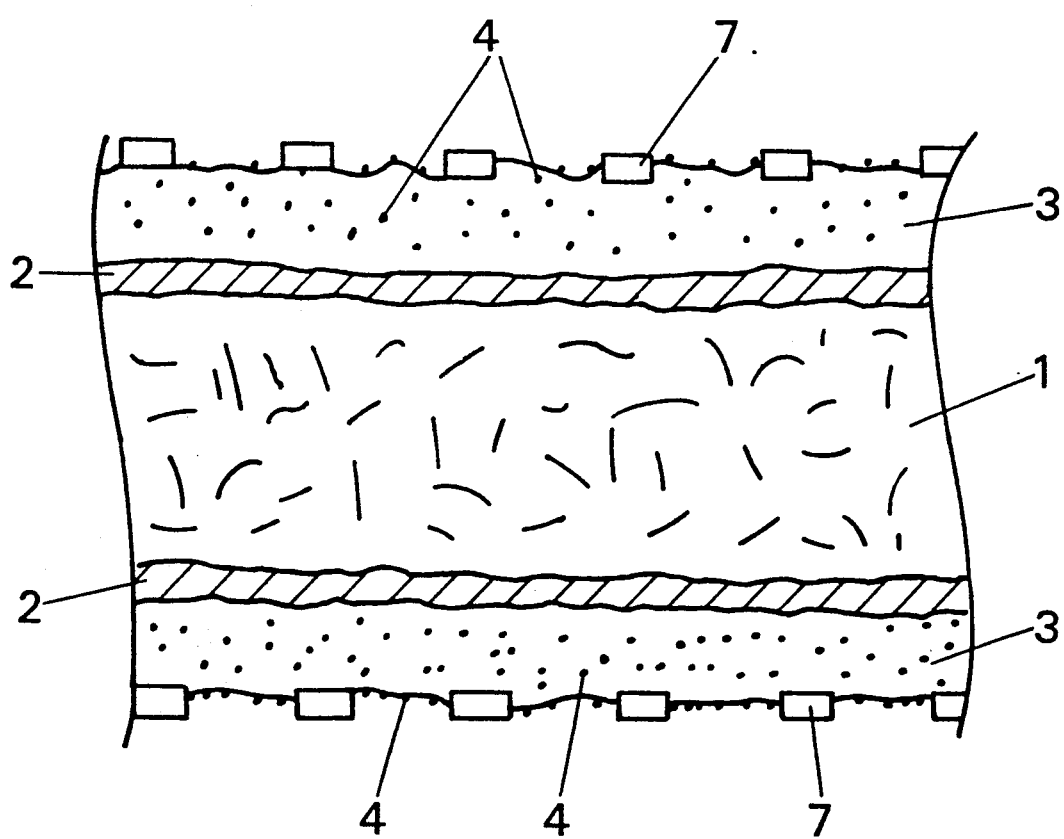
FIG. 4(a) is a partial sectional view of the second catalytic composite of the present invention.
FIG. 4(b) is a partial sectional view of the second catalytic composite which does not have an air permeable metal support.
Figure 4:
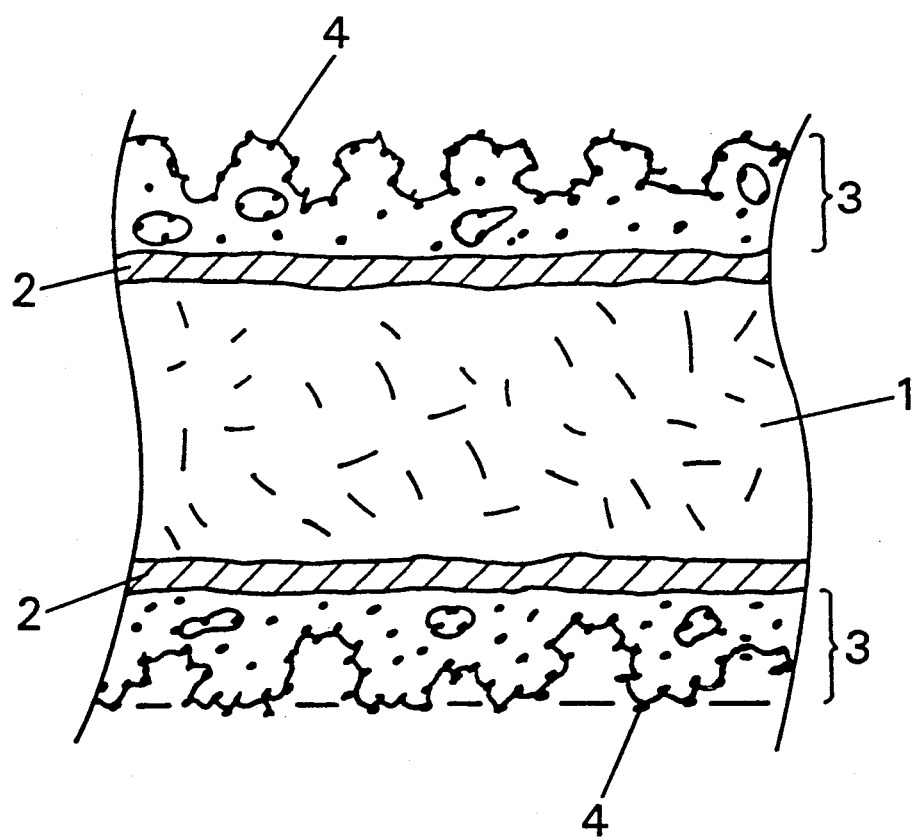

FIG. 4(a) shows a cross-section of an example of a second catalytic composite. This catalytic composite comprises a porous sheet 1 made of aluminum fibers, each surface of which is supported on air permeable metal support 7, film 2 made of aluminum oxide and silicon oxide formed on each surface of the porous sheet 1 by anodic oxidation, and a porous film 3 formed on each surface of the film 2 which contains fine particles 4 of cupric oxide. A second catalytic composite that does not have metal support shown in FIG. 4(b) can also be used.

Figure 5:
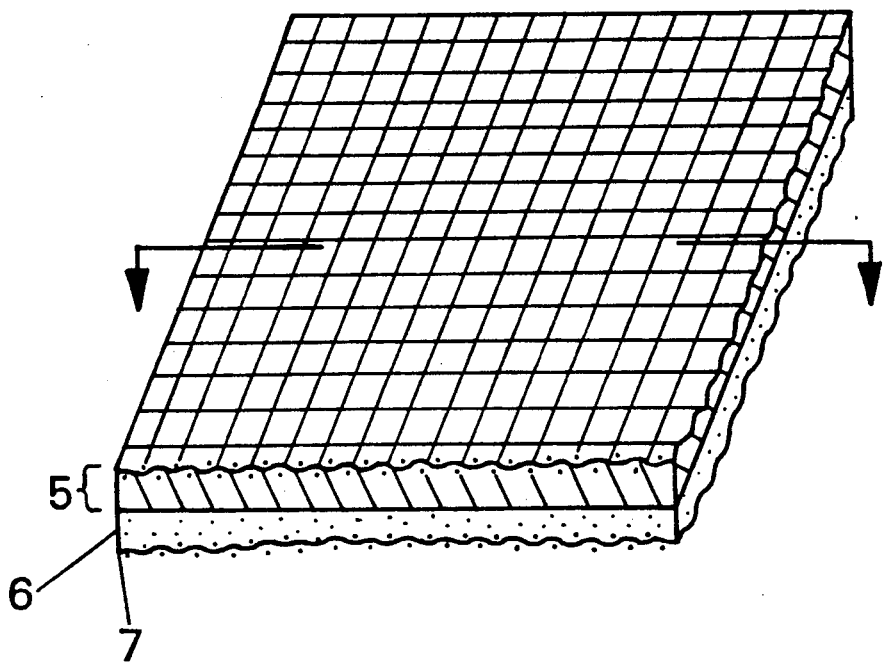
FIG. 5(a) is an enlarged partial perspective view showing a layered catalytic composite comprising a first and second catalytic composite of the present invention.
FIG. 5(b) is a cross-section taken along line V(b)—V(b) in FIG. 5(a)
Figure 5:
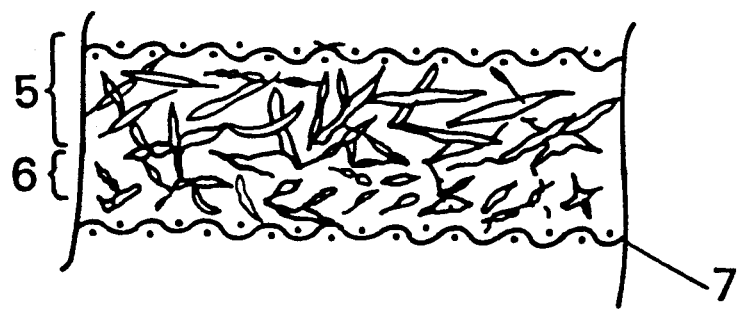

The first catalytic composite is highly capable of decomposing fats and oils by oxidation, while the second catalytic composite has excellent mechanical strength, although the second composite is slightly poor in the ability of decomposing fats and oils by oxidation as compared with the first catalytic composite. Therefore, when a catalytic composite is attached to the inner wall of the chamber of a heating cooker, a layered composite shown in FIGS. 5(a) and (b) containing the first catalytic composite 6 and second catalytic composite 5 is preferably used. FIG. 5(a) is an enlarged partial perspective view of the layered catalytic composite comprising a first catalytic composite 6, a second catalytic composite 5, and air permeable metal supports 7 disposed on both surfaces of the layered body composed of the first and second composite. FIG. 5(b) is a cross-section of the layered composite. Such a layered composite is prepared according to the following procedures. First, the first catalytic composite 6 and a porous sheet made of aluminum fiber, the sheet being subjected to anodic oxidation as necessary, are press-molded into a layered sheet. At the press-molding, an air permeable metal support 7 as shown in FIGS. 5(a) and 5(b), for example, an aluminum lath can be layered on at least one surface of the layered body of first and second catalytic composite. For example, the metal support is layered on the surface of the first composite for preventing the removal of the first composite from the second composite. When the layered composite is attached to the inner wall of a cooker so as to face the surface of the first composite to the surface of the wall, the support is layered on the surface of the second composite for the protection of the surface of the second composite. Such supports can be layered on both sides. Subsequently, a silicon oxide and/or aluminum oxide film is formed on the surface of the aluminum fiber side by anodizing as required, and then a porous film containing an oxidation catalyst such as $CuO_2$, is formed successively. The layered catalytic composite obtained in this way looks good in appearance, and can be easily provided in a heating cooker.

Such a layered catalytic composite is attached to the inner wall of a heating cooker so that the first catalytic composite of the layered composite is faced to the inner wall of the cooker. As the surface of the second catalytic composite 5 is faced to the inner space of the cooker, the catalytic composite can withstand possible mechanical impact which occurs during the process of cooking. FIG. 6(a) is a schematic view showing a cooker of the present invention. This cooker 8 comprises a cooking chamber 80 and a heating unit (not shown) provided in the chamber. On the inner wall of the cooking chamber 80 the layered catalytic composite of this invention is attached so that the surface of the first catalytic composite faces the inner wall. FIG. 6(b) is an enlarged partial view of the catalytic composite attached to the inner wall of the cooking chamber.

Figure 6:
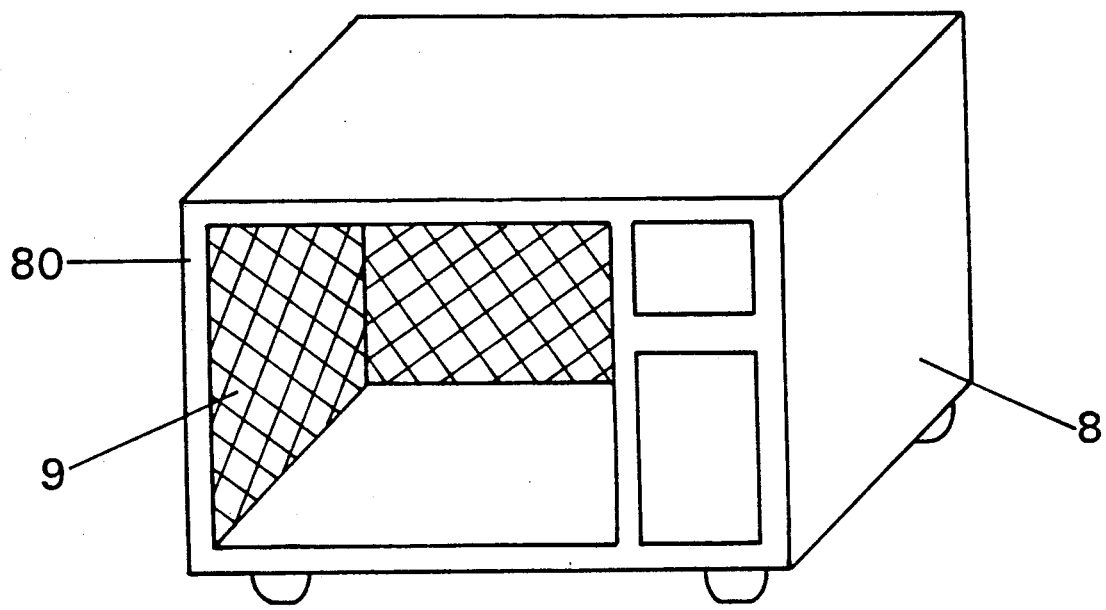
FIG. 6(a) is a schematic view showing a heating cooker having a catalytic composite of FIG. 5 which is attached to the inner wall of the cooking chamber.
FIG. 6(b) is an enlarged partially view showing a catalytic composite attached to the inner wall of the heating cooker shown in FIG. 6(a)
Figure 6:
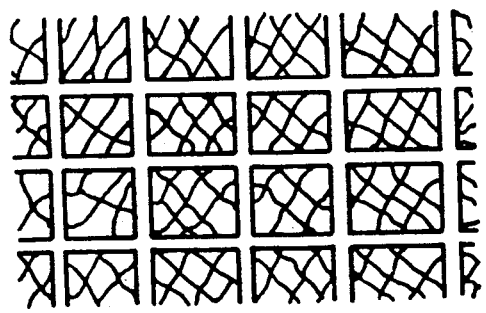

Fish meat (mackerel pike, saurel, etc.) as well as chicken meat was grilled in the heating cooker shown in FIG. 6, and after grease or stains scattered and deposited on the chamber wall were observed, blank baking was carried out for about 30 minutes. The temperature was maintained 300° C. or more for about 15 minutes. The grease or stains on the inner wall of the chamber decomposed completely. Judging by visual inspection, the surface of the inner wall was not particularly changed, as compared with the wall prior to cooking. When a cycle of cooking and blank baking was repeated for 100 times, some oil stain residue was found on the inner wall at the region where the maximum wall surface temperature was about 250° C. or lower, but on the whole the degree of decomposition of oil stains was completely satisfactory. The remaining residue at the lower temperature region can be improved by maintaining the interior of the chamber at high temperatures through improvement of adiabatic properties and temperature profile of the cooker. On the other hand, in a conventional cooker, oil stains were insufficiently decomposed. Thus, the amount of grease or stains in the cooking chamber was gradually increased.

When the layered catalytic composite is attached to the inner wall of a cooker so that the surface of the second catalytic composite is positioned at the inner side, liquid substances (oil stains or grease) such as oils permeate the first catalytic composite through the second catalytic composite. The liquid oil stains or grease are decomposed mainly in the first catalytic composite. Small amounts of the liquid stains or grease remain in the second catalytic composite, where decomposition can also be carried out effectively. Even if a large amount of oil was scattered, the oil can be effectively decomposed, because the oil is allowed to penetrate through the second catalytic composite into the first catalytic composite. The temperature required for decomposition is 300° C. or more, preferably 320° C. or more, as mentioned in the description of the second catalytic composite.

Figure 7:
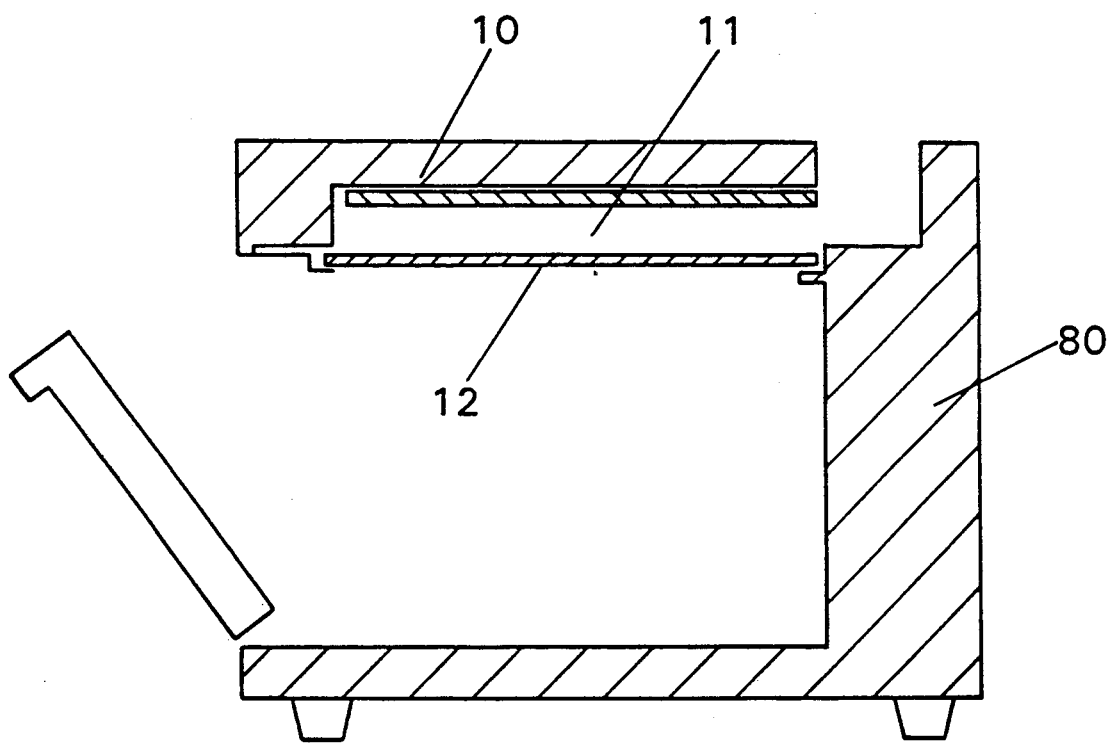
FIG. 7 is a schematic sectional view showing a heating cooker having a catalytic composite of FIG. 1 as a cooking exhausts removing means.

Alternatively, the catalytic composite of the present invention can be attached to the inner wall of an exhaust path of a heating cooker for the purpose of decomposing cooking exhausts emitting in the process of cooking, wherein the cooking exhausts carry oil particles having a diameter of several micrometers contained in smoke and steam. Cooking exhausts can be removed by adsorption on a filter, but the catalytic composite of this invention can be advantageously used for this purpose. In the heating cooker shown in FIG. 7, a flat plate-shaped or honeycomb-shaped first catalytic composite 10 is disposed extending along an exhaust path 11 formed in a upper portion of a cooking chamber 80. The exhaust path 11 is heated by a heater 12. Oil particles passing through the exhaust path are caught into pores of the first catalytic composite 10 and decomposed by an oxidation catalyst. It was observed that even when the rate of air discharge was high and when the oil concentration was high, oil particles could be effectively decomposed if the temperature of the catalyst was 350° C. or more. In the cooker shown in FIG. 7, where the first catalytic composite 10 was a flat plate shaped, 0.5 mm thick, 150 mm long (in the direction of exhaust air flow), and 200 mm wide (in a direction perpendicular to the direction of discharge flow), and where the rate of air discharge was about 6 cm/min$^{-1}$, oil particles could be satisfactorily decomposed. In such a heating cooker the shape of the catalyst composite is very simple and heat inertia of the heater 12 can be utilized to decompose cooking exhausts, thus, the heating cooker can be produced inexpensively.

As mentioned-above, the catalytic composite of the present invention for decomposing fats and oils by oxidation, is highly air permeable because it uses a highly porous sheet made of a ceramic fiber or aluminum fiber, so that sufficient oxygen necessary for decomposition of fats and oils can be easily supplied sufficiently. Furthermore, the composite has good wettability with fats and oils. Therefore, upon contact of fats and oils with the composite, the fats and oils are allowed to penetrate deep into the composite for effective contact with the catalyst. Therefore, fats and oils can be decomposed at comparatively low temperatures. In the cooker having the catalytic composite, it is possible to remove grease or stains that are deposited on the wall at temperatures of about 300° C. in a short time. If the catalytic composite is not used, high decomposition temperatures of 450° to 500° C. and a longer period of time e.g., up to 2 to 3 hrs are required. According to this invention, the high capacity of the heater is not required, resulting in a saving of energy.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A catalytic composite for decomposing fats and oils by oxidation, comprising: a porous sheet made of aluminum fibers, at least one surface of which is supported on an air permeable metal support; a film of silicon oxide or aluminum oxide which is formed on at least one surface of said porous sheet by anodic oxidation; and an oxidation catalyst carried on the surface of said film, said oxidation catalyst being at least one selected from the group consisting of manganese oxide, iron oxide, cobalt oxide, nickel oxide, copper oxide, lanthanum oxide, and cerium oxide.

2. A layered catalytic composite for decomposing fats and oils by oxidation, comprising a first catalytic composite, a second catalytic composite disposed on said first catalytic composite, and an air permeable metal support disposed on at least one surface of the layered body which is composed of said first and second catalytic composites, wherein said first catalytic composite is a sheet obtained by pressure molding of a mixture containing ceramic fibers and an oxidation catalyst, said ceramic fibers being made mainly of at least one selected from the group consisting of silicon oxide, aluminum oxide, and zirconium oxide, and said oxidation catalyst being at least one selected from the group consisting of manganese oxide, iron oxide, cobalt oxide, nickel oxide, copper oxide, lanthanum oxide, and cerium oxide, and wherein said second catalytic composite comprises a porous sheet made of aluminum fibers and an oxidation catalyst carried on the surface of said porous sheet, said oxidation catalyst being at least one selected from the group consisting of manganese oxide, iron oxide, cobalt oxide, nickel oxide, copper oxide, lanthanum oxide, and cerium oxide.

3. A layered catalytic composite according to claim 2, further comprising a film of silicon oxide or aluminum oxide which is formed on said porous sheet, wherein said oxidation catalyst is carried on the surface of said film.

4. A heating cooker having a layered catalytic composite of claim 2, wherein said layered catalytic composite is attached to the inner wall of said cooker for the purpose of decomposing by oxidation, fats and oils or cooking exhausts which are formed or emitted in the process of cooking so that the first catalytic composite of the layered catalytic composite is faced with said inner wall.

* * * * *